(12) United States Patent
Marino et al.

(10) Patent No.: US 7,245,381 B2
(45) Date of Patent: Jul. 17, 2007

(54) RING LASER GYROSCOPE THAT DOES NOT REQUIRE MIRRORS

(75) Inventors: Kenneth Marino, Oak Park, CA (US); Daniel A. Tazartes, West Hills, CA (US); Charles Volk, Newbury Park, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 295 days.

(21) Appl. No.: 11/017,446

(22) Filed: Dec. 20, 2004

(65) Prior Publication Data

US 2006/0132788 A1  Jun. 22, 2006

(51) Int. Cl.
*G01C 19/64* (2006.01)

(52) U.S. Cl. .................................. 356/461

(58) Field of Classification Search ........ 356/459–461; 372/94
See application file for complete search history.

(56) References Cited

U.S. PATENT DOCUMENTS 4,013,365 A * 3/1977 Vali et al. .................. 356/460
5,802,236 A * 9/1998 DiGiovanni et al. ........ 385/127
2004/0061863 A1 * 4/2004 Digonnet .................... 356/460
2004/0263856 A1 * 12/2004 Willig et al. ................ 356/460

OTHER PUBLICATIONS

Kuriki, Ken et al., Hollow multilayer photonic bandgap fibers for NIR applications, Optic Express, Apr. 19, 2004, pp. 1510-1517, vol. 12, No. 8, MIT, Massachusetts.
Bilger, Hans et al., World's largest ring laser gyro will measure earth's rotation, SpieWeb, pp. 1-7, www.spie.org/web/oer/september/sep96/gyro.html.

* cited by examiner

*Primary Examiner*—Samuel A. Turner
(74) *Attorney, Agent, or Firm*—Carmen B. Patti & Assoc., LLC

(57) ABSTRACT

In an embodiment of a ring laser gyroscope, a hollow bandgap fiber is filled with a gas or material that will generate laser beams within the fiber upon being excited by an energy source. A detector coupled to the fiber detects a standing wave pattern within the fiber, wherein changes in the detected standing wave pattern indicates a corresponding change in the orientation of the fiber.

38 Claims, 1 Drawing Sheet

RING LASER GYROSCOPE THAT DOES NOT REQUIRE MIRRORS

BACKGROUND

This invention relates in general to gyroscopes and more specifically to ring laser gyroscopes.

Navigational systems represent an important use of gyroscopes since it is important to know and/or maintain a specific orientation of a vehicle or movable device relative to another location or object. A gyroscope outputs information related its change in orientation and hence can determine the orientation of the vehicle to which it is mounted. This output information can be processed and displayed to provide a measurement of the orientation of the vehicle and can also be used as a feedback signal coupled to a propulsion system to maintain a specified orientation of the vehicle.

Conventional gyroscopes with a spinning wheel make use of the effect of precession in which the spinning wheel maintains its orientation relative to the plane in which the wheel spends. Although spinning wheel gyroscopes have been effective, such gyroscopes have limitations in accuracy and durability due to friction and mechanical aspects associated with the spinning wheel.

The ring laser gyroscope represents an improvement over the spinning wheel gyroscope by eliminating the need for moving parts. The Sagnac effect is a relativistic effect related to the rotation of a closed optical path. The Sagnac effect in a ring laser results in a frequency difference between counter rotating laser beams (modes) when the ring is rotated such frequency difference being proportional to the angular rate about an axis perpendicular to the plane of the beam path. A conventional ring laser gyroscope uses a series of mirrors to reflect two free-space laser beams in opposite directions around a "ring". The ring consists of a triangle, rectangle, or other closed multiple-sided geometric configuration in which mirrors are disposed at the corners to reflect the laser beams along the adjacent straight legs in the configuration. The two laser beams create a virtual interference pattern or standing wave around the ring which remains stationary in inertial space. The movement of a ring laser gyroscope about the plane of the ring causes a shift of the position of the body of the gyroscope relative to the standing wave depending on the direction of the movement of the gyroscope. A detector coupled to the ring measures the position of the detector/ring relative to the standing wave and provides an output signal related to the change in orientation of the ring.

Extremely high-quality mirrors are required for conventional ring laser gyroscopes and must be made to exacting standards of flatness, high reflectivity, and low dispersion. Producing the mirrors to such exacting standards results in high manufacturing costs that must be reflected in the total cost of the gyroscope. Thus, there exists a need for an improved gyroscope that can substantially overcome the difficulties and costs associated with requiring multiple mirrors.

SUMMARY OF THE INVENTION

In accordance with an embodiment of a ring laser gyroscope pursuant to the present invention, a hollow core photonic fiber is filled with a material, e.g. a gas, that will generate and sustain laser beams within the fiber upon being excited by an energy source. A detector coupled to the fiber detects a standing wave pattern within the fiber, wherein changes in the detected standing wave pattern indicates a corresponding change in the orientation of the fiber.

DETAILED DESCRIPTION

Figure 1:
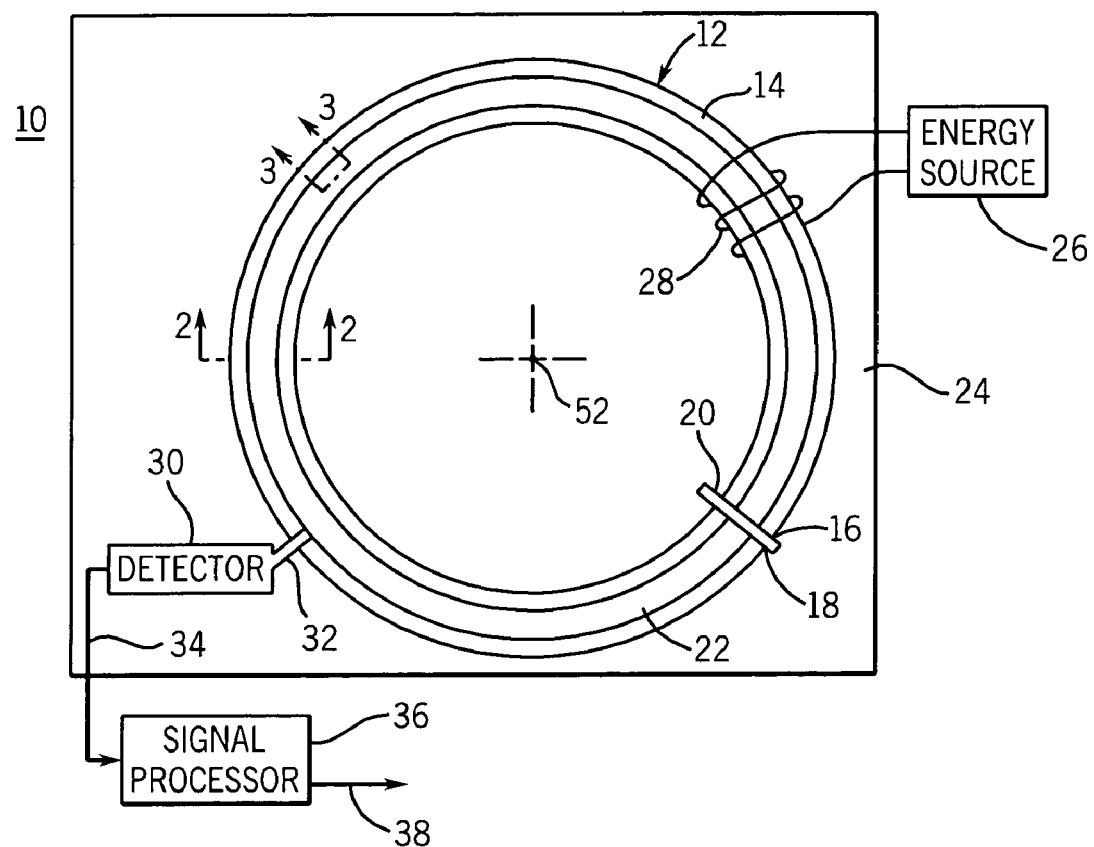
FIG. 1 is a representation of an embodiment of a ring laser gyroscope in accordance with the present invention.

FIG. 1 shows an embodiment 10 of a ring laser gyroscope in accordance with the present invention. The ring 12 is preferably constructed of a hollow photonic bandgap fiber 14 and is shown in FIG. 1 as if it had been severed along its longitudinal centerline to better show that the interior is hollow. It will be understood that fiber 14 is actually a closed cylindrical elongated fiber. The ends 16 and 18 of the fiber 14 are coupled together by a splice 20 to create a closed configuration that defines a continuous, hollow passage 22. The purpose of the splice 20 is to connect the ends 16 and 18 of the fiber 14 together to form a continuous loop with a minimum of discontinuities being introduced by the splice. Before the ends 16 and 18 are coupled together, the passage 22 is filled, preferably completely, with a material, such as a gas, that will lase when excited by externally provided energy. For example, helium neon gas can be utilized and when excited produces a laser beam of 633 nanometer wavelength. If helium neon gas is used, the fiber is preferably designed to pass this wavelength with a minimum of attenuation. The ring 12 may be mounted to a substantially planar base 24 that provides a mechanically stable environment for the ring. The plane of the ring 12 is preferably parallel to the plane of the base 24.

Additional elements are associated with the ring 12 to comprise the gyroscope 10. An energy source 26 is used to supply a sufficient amount of energy to the gas in the fiber in order to cause the gas to lase. In this example, energy source 26 can be a source of radio frequency energy that is coupled to the fiber 14 via a coil 28 that encircles the fiber.

A coupler/combiner 32 is used to extract a small portion of the light from each of the counter-propagating beams in fiber 14. Coupler/combiner 32 also couples the beams in order to create an observable interference pattern. A detector module 30 detects the movement of the peaks and valleys of the standing wave created by the interference of the two counter-propagating beams in coupler/combiner 32. The detector module 30 may, for example, be a photo-detector capable of discerning changes in light intensity representing the peaks and valleys in the standing wave.

Outputs 34 of detector module 30 are coupled to signal processor 36. The analog signal representing the sensed light intensity generated by detector module 30 is converted by the detector module 30 or signal processor 36 into a digital signal for further processing by the signal processor 36. An exemplary signal processor 36 may include a microprocessor, read-only memory (ROM), and random access memory (RAM). It may also include an analog to digital (A/D) converter if the signal processor is required to convert an analog output from detector 30 into digital form. Stored program control instructions may be stored in the ROM to control the processing of signal information from the detector 30 by the microprocessor. Depending upon the specific application, the signal processor 36 may also include a visual display showing the sensed orientation of the ring 12 relative to an initial point of reference, and may include a digital output 38 that carries a digital output signal representative of the sensed orientation. The digital output signal may be used to track the orientation of the body, or may be used to stabilize a body. For example, the digital output signal may be utilized as a feedback signal coupled to a propulsion system (not shown) that can be utilized to correct or adjust the position of a vehicle in order to maintain a desired orientation as sensed by the gyroscope 10. Although the energy source 26 and signal processor 36 is shown in FIG. 1 as not being supported by base 24, these elements may be supported by the base depending upon the specific application.

Figure 2:
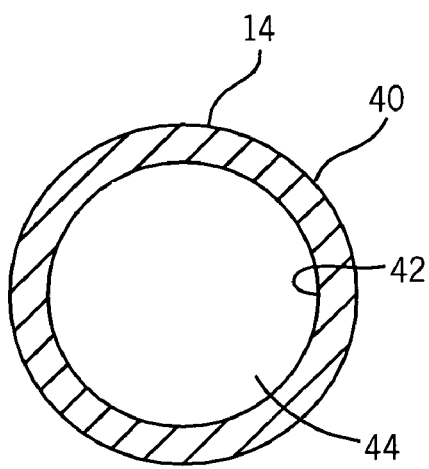
FIG. 2 is a cross-sectional view of the exemplary ring laser as shown in FIG. 1 taken about line 2-2.

FIG. 2 shows a cross-section of fiber 14. The fiber preferably has a generally circular wall with an outer surface 40 and an inner surface 42. The inner surface 42 defines a hollow interior chamber 44 that is filled with the helium neon gas in the illustrative example. As will be known to those skilled in the art, hollow-core photonic bandgap filters of various designs are known. In the illustrative example, a single hollow chamber is enclosed by the wall of fiber 14. For this construction, multiple layers of alternating high and low index of refraction materials are sandwiched together to form the wall, with the materials being selected to provide low losses for the laser wavelength to be utilized with the fiber. Alternatively, photonic bandgap fibers have been constructed from arrays of parallel air holes in a solid dielectric. As used herein, a photonic bandgap fiber means all types of such fibers that contain one or more hollow holes that can be filled with a material that will lase as well as photonic bandgap fibers may be filled or constructed with a solid or liquid material that can provide optical gain and sustain the counter-propagating laser beams.

Figure 3:
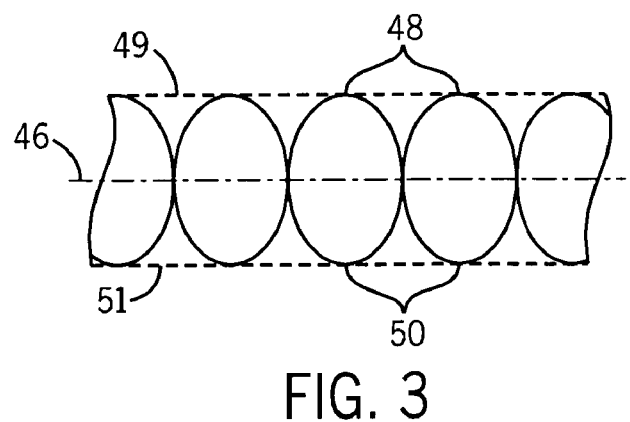
FIG. 3 is an enlarged, cross-sectional view of the exemplary ring laser as shown in FIG. 1 taken about line 3-3 illustrating standing waves within the ring.

FIG. 3 is a longitudinal cross-sectional view of a portion of the fiber 14. It shows a virtual pattern of standing waves disposed about the longitudinal centerline 46 of the fiber. It is understood that this interference pattern is not actually realized or observable unless the beams are coupled together. Thus FIG. 3 shows what the "virtual" interference would be if the beams were interfered at every point along the path. In reality, the beams are typically only interfered at one given location defined by the coupler/combiner 32. Referring to FIG. 3, a plurality of peaks 48 and valleys 50 extend along the path defined by fiber core 44. The peak intensity of the interference pattern is indicated by the level 49 while the minimum intensity is indicated by level 51. The virtual standing waves are the result of constructive and destructive interference between two laser beams (modes) traveling in opposite directions in the hollow chamber 44 in the closed ring of fiber 14. Two laser beams occur in this environment whenever sufficient energy is coupled to the gas within chamber 44 as the excitation of this gas causes amplified stimulated emission resulting in lasing within the closed ring 14.

The property of a ring laser that makes its suitable for use as a component in a gyroscope is that the virtual standing wave pattern remains stationary relative to an external fixed point of reference even if the ring itself is rotated about its axis. Thus, as the ring laser is rotated about its center 52, the wall of the fiber 14 will move relative to the standing wave pattern causing the detector 30 to sense relative movement of the peaks and valleys of the standing wave pattern relative to the detector which is fixed at a location on the fiber. Thus, the number of peaks and/or valleys that is sensed passing by the detector 30 can be utilized to measure the amount of rotation of the ring about its center.

As will be apparent for the above explanation of the illustrative embodiment, a ring laser gyroscope in accordance with the present invention is provided which does not require the use of mirrors. Conventional ring laser gyroscopes that utilize mirrors require the precise positioning and alignment of such mirrors. Additionally, the mirrors are expensive to manufacture due to the high exacting standards required to yield mirrors with suitable characteristics. Thus, the difficulties associated with the use of such mirrors in conventional ring laser gyroscopes are avoided.

Although an embodiment of the invention has been described above and shown in the figures, it will be apparent to those skilled in the art that various modifications and variations can be made. For example, various types of other energy sources can be utilized including, but not limited to, a source of light energy such as another laser as well as other types of sources capable of coupling sufficient energy to the gas/material within the fiber to cause it to lase. Other gases or materials capable of sustaining a laser beam could be used. The fiber can be designed to support the wavelength of operation with minimal losses. The shape of the fiber could be other types of closed geometric configurations as well as a circle.

The scope of the present invention is defined by the claims that follow, and is not to be limited to the specific embodiment disclosed above.

What is claimed is:

1. A laser gyroscope comprising:
   a hollow photonic fiber with first and second ends connected together to form a hollow chamber of a continuous loop;
   a source of energy;
   a material disposed within the hollow chamber that will lase upon receiving energy from the source of energy thereby producing a laser beam within the continuous loop of the hollow chamber; and
   a detector coupled to the fiber and adapted to measure changes in a standing wave pattern in the laser beam relative to a detector.

2. The laser gyroscope of claim 1 wherein first and second laser beams propagate in opposite directions within the hollow fiber.

3. The laser gyroscope of claim 2 wherein the detector extracts a portion of the first and second beams and causes the first and second beams to interfere.

4. The laser gyroscope of claim 2 wherein the detector measures changes in a standing wave pattern of the first and second laser beams relative to the detector.

5. The laser gyroscope of claim 1 wherein the fiber is a photonic bandgap fiber.

6. The laser gyroscope of claim 1 wherein the material disposed within the hollow chamber is a gas.

7. The laser gyroscope of claim 5 wherein the gas is a mixture of helium and neon gas.

8. The laser gyroscope of claim 2 wherein the detector comprises an optical detector adapted to measure the intensity of light of a wavelength utilized by the laser beam.

9. The laser gyroscope of claim 1 wherein the source of energy comprises a source of radio frequency energy.

10. The laser gyroscope of claim 9 further comprising a coil that surrounds at least a portion of the fiber and is coupled to the source of radio frequency energy, the coil serving to couple radio frequency energy to the material disposed within the hollow chamber.

11. The laser gyroscope of claim 2 further comprising a signal processor coupled to an output of the detector, the signal processor adapted to provide a digital output signal that corresponds to the output from the detector, wherein the digital output signal indicates a current orientation of the fiber.

12. The laser gyroscope of claim 11 wherein the current orientation of the fiber indicates a rotational orientation of the fiber in the plane of the fiber.

13. The laser gyroscope of claim 1 further comprising a substantially planar base that supports the fiber.

14. The laser gyroscope of claim 13 wherein the fiber is disposed within a plane, and the plane of the fiber is substantially parallel to the planar base.

15. The laser gyroscope of claim 1 wherein a longitudinal centerline of the fiber is disposed within a plane.

16. A method for determining a second orientation of a movable object relative to a first orientation comprising the steps of:
  forming a continuous loop of a hollow photonic fiber to form a hollow chamber within the continuous loop;
  disposing a material that will lase within the hollow chamber;
  mounting the continuous loop of hollow photonic fiber to the movable object;
  supplying energy to the material causing a laser beam to be produced within the hollow chamber;
  detecting changes in a standing wave pattern in the laser beam relative to the first orientation of the fiber whereby the changes in the standing wave pattern corresponds to a changed orientation of the movable object from the first to the second orientation;
  conveying orientation information to a user about the movable object based on the detected changes.

17. The method according to claim 16 wherein the step of disposing a material that will lase within the hollow chamber consists of disposing a gas that will lase within the hollow chamber.

18. The method according to claim 16 wherein the step of mounting the continuous loop of hollow photonic fiber to the movable object comprises mounting the continuous loop of hollow photonic fiber within a first plane associated with the movable object and wherein the changes in the standing wave pattern corresponds to a changed orientation of the movable object to the second orientation in the first plane relative to the first orientation in the first plane.

19. A ring laser gyroscope comprising:
  a hollow photonic bandgap fiber formed into a continuous loop defining a hollow, continuous loop, chamber;
  a material disposed within the hollow chamber adapted to generate counterpropagating first and second laser beams upon receiving energy from an energy source;
  a detector adapted to measure changes in a standing wave pattern of the laser beams relative to a location on the fiber, wherein changes in the standing wave pattern correspond to changes in orientation of the fiber.

20. The laser gyroscope of claim 19 wherein the detector is coupled to the fiber and adapted to extract a portion of the counterpropagating first and second beams and cause them to interfere.

21. The ring laser gyroscope of claim 19 wherein a longitudinal centerline of the fiber is disposed substantially in a first plane, the detector adapted to measure changes in the standing wave pattern of the laser beam wherein the changes correspond to changes in orientation of the fiber in the first plane.

22. The ring laser gyroscope of claim 19 wherein the material comprises a gas that will lase.

23. The ring laser gyroscope of claim 19 wherein the energy source comprises a source of radio frequency energy coupled to the material by a coil that encircles the fiber.

24. The ring laser gyroscope of claim 19 further comprising a signal processor coupled to an output of the detector wherein the signal processor is adapted to provide a digital output signal corresponding to the orientation of the fiber.

25. A laser gyroscope comprising:
  a photonic bandgap fiber with first and second ends connected together to form a continuous loop;
  a source of energy;
  a material disposed within the fiber that will lase upon receiving energy from the source of energy adapted to produce first and second counterpropagating laser beams within the continuous loop of the hollow chamber; and
  a detector coupled to the fiber and adapted to extract a portion of the counterpropagating first and second beams and cause them to interfere.

26. The laser gyroscope of claim 25 wherein the first and second laser beams propagate in opposite directions within the fiber.

27. The laser gyroscope of claim 25 wherein the detector measures changes in a standing wave pattern in the first and second laser beams relative to the detector.

28. The laser gyroscope of claim 25 wherein the material disposed within the hollow chamber is a gas.

29. The laser gyroscope of claim 25 wherein the material disposed within the hollow chamber is a solid.

30. The laser gyroscope of claim 25 wherein the material disposed within the hollow chamber is a liquid.

31. The laser gyroscope of claim 25 wherein the detector comprises an optical detector adapted to measure the intensity of light of a wavelength utilized by the first and second laser beams.

32. The laser gyroscope of claim 25 wherein the source of energy comprises a source of radio frequency energy.

33. The laser gyroscope of claim 32 further comprising a coil that surrounds at least a portion of the fiber and is coupled to the source of radio frequency energy, the coil serving to couple radio frequency energy to the material disposed within the hollow chamber.

34. The laser gyroscope of claim 25 further comprising a signal processor coupled to an output of the detector, the signal processor adapted to provide a digital output signal that corresponds to the output from the detector, wherein the digital output signal indicates a current orientation of the fiber.

35. The laser gyroscope of claim 34 wherein the current orientation of the fiber indicates a rotational orientation of the fiber in the plane of the fiber.

36. The laser gyroscope of claim 25 further comprising a substantially planar base that supports the fiber.

37. The laser gyroscope of claim 36 wherein the fiber is disposed within a plane, and the plane of the fiber is substantially parallel to the planar base.

38. The laser gyroscope of claim 36 wherein a longitudinal centerline of the fiber is disposed within a plane.

* * * * *